United States Patent [19]
Omori et al.

[11] Patent Number: 5,581,120
[45] Date of Patent: Dec. 3, 1996

[54] SEMICONDUCTOR DEVICE CARD SYSTEM

[75] Inventors: Makoto Omori; Hajime Maeda, both of Itami, Japan

[73] Assignee: Mitsubishi Denki Kabushiki Kaisha, Tokyo, Japan

[21] Appl. No.: 382,632

[22] Filed: Feb. 2, 1995

[30] Foreign Application Priority Data

Feb. 8, 1994 [JP] Japan .................................. 6-014580

[51] Int. Cl.$^6$ ........................... H01L 23/02; H01L 23/34; H01L 23/58
[52] U.S. Cl. ........................ 257/679; 257/723; 257/922
[58] Field of Search ................................ 257/922, 679, 257/723

[56] References Cited

U.S. PATENT DOCUMENTS 5,416,358  5/1995  Ochi et al. ............................... 257/675

FOREIGN PATENT DOCUMENTS 2688940  9/1993  France ................................. 257/679

*Primary Examiner*—Mahshid Saadat
*Assistant Examiner*—Valencia Martin Wallace
*Attorney, Agent, or Firm*—Leydig, Voit & Mayer

[57] ABSTRACT

A semiconductor device card system is capable of preventing foreign matter from entering from outside even when a semiconductor device is mounted and to prevent the semiconductor device card from being removed inadvertently. A mounting section of a semiconductor device card is disposed in a semiconductor device card system unit. The mounting section includes an openable mounting section door, and a window for a connector, disposed in the mounting section door, and through which a back-end connector is inserted.

8 Claims, 6 Drawing Sheets

5,581,120

SEMICONDUCTOR DEVICE CARD SYSTEM

BACKGROUND OF THE INVENTION

1. Field of the Invention

The present invention relates to a semiconductor device card system and, more particularly, to a semiconductor device card system for a personal computer using a semiconductor device card.

2. Description of the Related Art

FIG. 13 is a schematic perspective view illustrating a conventional semiconductor device card system using a semiconductor device card having connectors at both the front end portion and the back end portion. FIG. 14 is a schematic side sectional view of the semiconductor device card system. In FIGS. 13 and 14, a semiconductor device card system unit 1, while it is operating, has a semiconductor device card 2 mounted in a mounting section 3 of the semiconductor device card system unit 1. The semiconductor device card 2 is inserted into the semiconductor device card system unit 1 via a door 4 of the mounting section 3 and is electrically connected to a connector 6 on the system unit side by means of a front-end connector (not shown).

A back-end connector 5 is connected to the back end portion of the semiconductor device card 2, and a cable 5a connected to a LAN cable or the like is connected to the back-end connector 5. Since one type of semiconductor device card 2, a communication card, such as a LAN card or a modem card, has appeared on the market, a connector for connecting a communication cable between these cards becomes necessary. Thus, a back-end connector is disposed separately from the system unit-side connector.

However, in the above-described semiconductor device card system, when the semiconductor device card 2 is mounted in the semiconductor device card system unit 1, the door 4 of the mounting section is opened. Therefore, foreign matter, such as dust or dirt, enters the semiconductor device card system unit 1 at the clearance between the door 4 of the mounting section, or the back-end connector 5 is removed inadvertently during operation, or the semiconductor device card 2 is removed from the connector 6 on the system unit side, thereby erasing the memory of the semiconductor device card 2, which is problematical.

SUMMARY OF THE INVENTION

The present invention has been achieved to solve the above-described problems of the prior art. An object of the present invention is to obtain a semiconductor device card system in which foreign matter can be prevented from entering from outside even if a semiconductor device is mounted, and an inadvertent removal of the semiconductor device card can be prevented. To achieve the above object, according to one aspect of the present invention, there is provided a semiconductor device card system having a mounting section to which is mounted a semiconductor device card having a connection portion connected to both a front end portion and a back end portion, wherein the mounting section has an openable mounting section door, and the mounting section door has an opening portion to which a connection portion connected to the back end portion of the semiconductor device card is inserted.

DESCRIPTION OF THE PREFERRED EMBODIMENTS

First Embodiment

Figure 1:
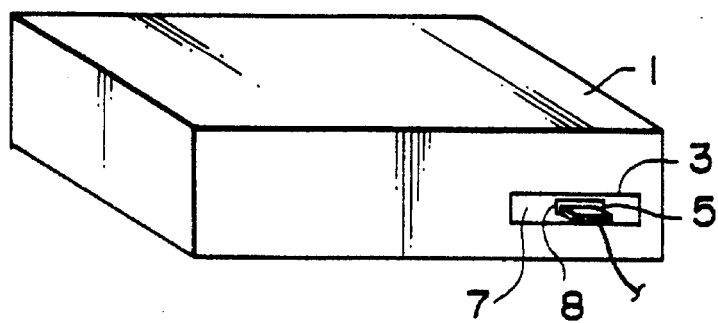
FIG. 1 is a perspective view illustrating a semiconductor device card system in accordance with a first embodiment of the present invention.
Figure 2A:
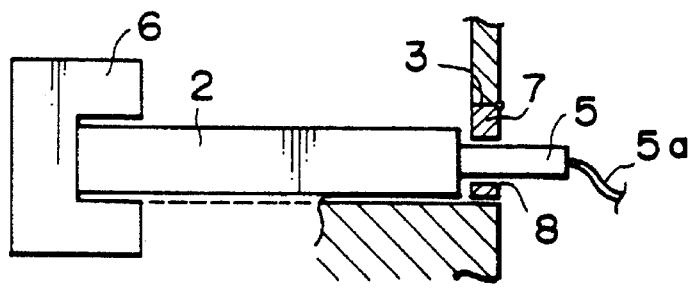
FIGS. 2A and 2B are schematic sectional side views illustrating a portion of the semiconductor device card system in accordance with the first embodiment of the present invention.
Figure 2B:
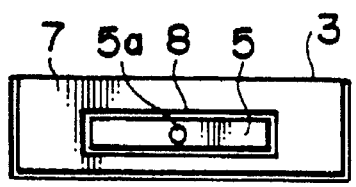

FIG. 1 is a perspective view illustrating a semiconductor device card system in accordance with a first embodiment of the present invention. FIGS. 2A and 2B are, respectively, a schematic sectional side view of a portion of the semiconductor device card system and a front view thereof. Referring to FIGS. 1 and 2A and 2B, reference numeral 1 denotes a unit of a semiconductor device card system; reference numeral 2 denotes a semiconductor device card mounted in the semiconductor device card system unit 1; reference numeral 3 denotes a mounting section of the semiconductor device card 2 disposed in the semiconductor device card system unit 1; reference numeral 5 denotes a back-end connector 5, which is a connection portion disposed in the back end portion of the semiconductor device card 2; reference numeral 5a denotes a cable 5a of the back-end connector 5; reference numeral 6 denotes a connector on the semiconductor device card system unit 1; reference numeral 7 denotes a door of the mounting section of the semiconductor device card 2 which is disposed in the mounting section 3 of the semiconductor device card system unit 1 in such a manner as to be openable; and reference numeral 8 denotes a window for a connector. The window is an opening in which the back-end connector 5 disposed in the door 7 of the mounting section is mounted.

In the semiconductor device card system constructed as described above, first, the door 7 of the mounting section is opened, and then the semiconductor device card 2 is mounted in the semiconductor device card system unit 1. Next, the door 7 of the mounting section is closed, and the back-end connector 5 is connected to the back end portion of the mounted semiconductor device card 2. Therefore, it is possible to close the door 7 of the mounting section 3 even while the semiconductor device card system unit 1 is operating. Also, since the clearance between the door 7 of the mounting section and the back-end connector 5 is small, it is possible to prevent foreign matter from entering the semiconductor device card system unit 1.

Figure 2C:
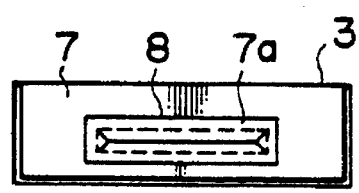
FIG. 2C is a front view thereof.

As shown in FIG. 2C, a rubber cover 7a having a slit may be provided in the window 8 for a connector. Thus, even when the back-end connector 5 is not used or when the semiconductor device card 2 is not mounted, it is possible to prevent foreign matter from entering the semiconductor device card system unit 1.

Second Embodiment

Figure 3A:
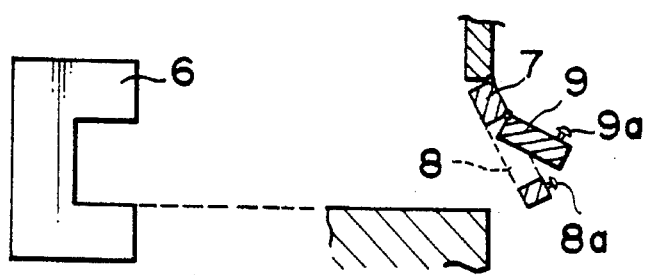
FIGS. 3A and 3B are, respectively, a schematic sectional side view and a front view of a portion of a semiconductor device card system in accordance with a second embodiment of the present invention.
Figure 3B:
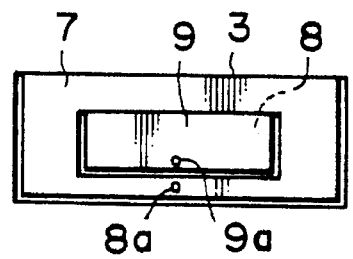

FIGS. 3A and 3B are, respectively, a schematic sectional side view and a front view of a portion of a semiconductor device card system in accordance with a second embodiment of the present invention. In FIGS. 3A and 3B, a door 9, which is a door member of the window 8 for a connector, is disposed in the door 7 of the mounting section of the semiconductor device card 2. This door 9 makes it possible to prevent foreign matter from entering from outside even if the semiconductor device card system unit 1 is not operating.

Knobs 8a and 9a may be provided in the door 7 of the mounting section and the door 9, respectively, so that the door 7 of the mounting section and the door 9 can be easily opened.

Third Embodiment

Figure 4A:
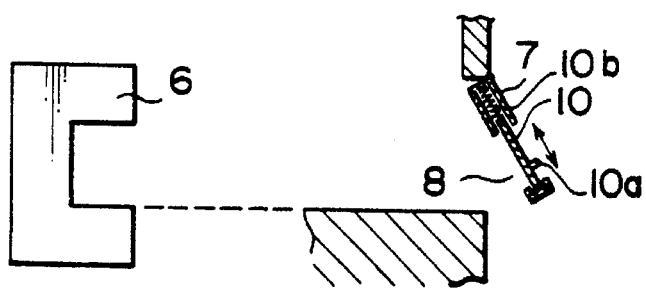
FIGS. 4A and 4B are, respectively, a schematic sectional side view and a front view of a portion of a semiconductor device card system in accordance with a third embodiment of the present invention.
Figure 4B:
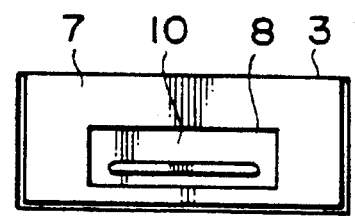

FIGS. 4A and 4B are, respectively, a schematic sectional side view and a front view of a portion of a semiconductor device card system in accordance with a third embodiment of the present invention. In FIGS. 4A and 4B, a shutter-shaped door 10 which is always urged in the closed direction and automatically closed is disposed in the door 7 of the mounting section of the semiconductor device card 2. The shutter-shaped door 10 makes it possible to prevent foreign matter from entering from outside even when the semiconductor device card 2 is not mounted.

A knob 10a may be provided in the shutter-shaped door 10 so that the shutter-shaped door 10 can be easily opened. Since the shutter-shaped door 10 is automatically closed by a spring 10b, forgetting to close the shutter-shaped door 10 does not prevent the door 10 from closing.

Fourth Embodiment

Figure 5A:
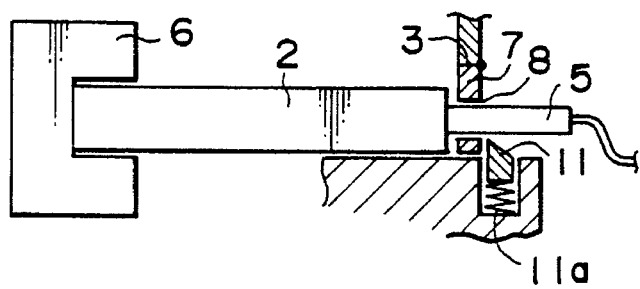
FIGS. 5A and 5B are, respectively, a schematic sectional side view and a front view of a portion of a semiconductor device card system in accordance with a fourth embodiment of the present invention.
Figure 5B:
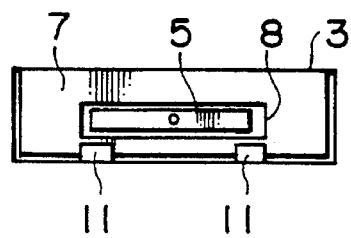

FIGS. 5A and 5B are, respectively, a schematic sectional side view and a front view of a portion of a semiconductor device card system in accordance with a fourth embodiment of the present invention. In FIGS. 5A and 5B, an engagement claw 11, which is an engagement mechanism for preventing the door 7 of the mounting section from opening, is disposed in the lower portion of the mounting section 3. This engagement claw 11 prevents the semiconductor device card 2 from being removed from the connector 6 on the system unit side even if the back-end connector 5 is removed by mistake while the unit of the semiconductor device card system unit 1 is operating.

Fifth Embodiment

Figure 6:
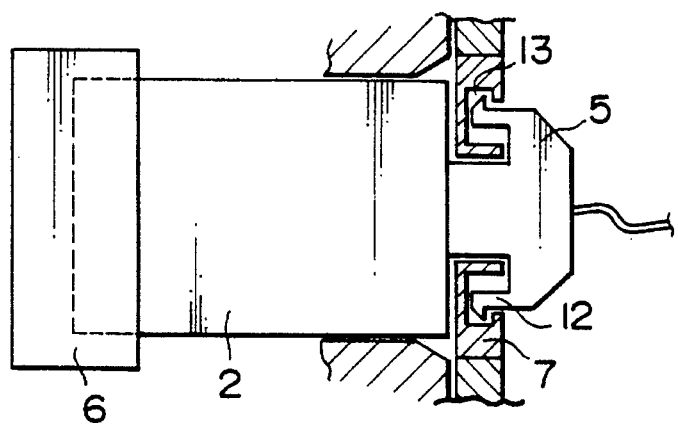
FIG. 6 is a plan view illustrating a portion of a semiconductor device card system in accordance with a fifth embodiment of the present invention.

FIG. 6 is a plan view illustrating a portion of a semiconductor device card system in accordance with a fifth embodiment of the present invention. In FIG. 6, an engagement claw 12 is disposed in the back-end connector 5 of the semiconductor device card 2 along the width of the semiconductor device card 2, and an engagement portion 13 that engages the engagement claw 12 is disposed in the door 7 of the mounting section. When the back-end connector 5 is mounted in the semiconductor device card 2, the engagement claw 12 is deflected and then hooked to the engagement portion 13. When the back-end connector 5 is removed, the engagement claw 12 can be pressed and bent inward by a hand to release the engagement. The engagement claw 12 and the engagement portion 13 prevent the semiconductor device card 2 and the back-end connector 5 from being removed inadvertently while the semiconductor device card system unit 1 is operating.

Sixth Embodiment

Figure 7:
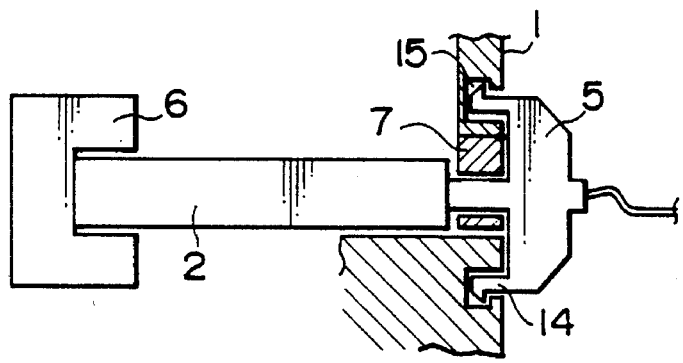
FIG. 7 is a schematic sectional side view illustrating a semiconductor device card system in accordance with a sixth embodiment of the present invention.

FIG. 7 is a schematic sectional side view illustrating a semiconductor device card system in accordance with a sixth embodiment of the present invention. In FIG. 7, an engagement claw 14 is disposed in the back-end connector 5 of the semiconductor device card 2 along the length of the semiconductor device card 2, and an engagement portion 15 which engages the engagement claw 14 is disposed in the door 7 of the mounting section. The engagement claw 14 and the engagement portion 15 prevent the semiconductor device card 2 and the back-end connector 5 from being removed inadvertently while the semiconductor device card system unit 1 is operating.

Seventh Embodiment

Figure 8A:
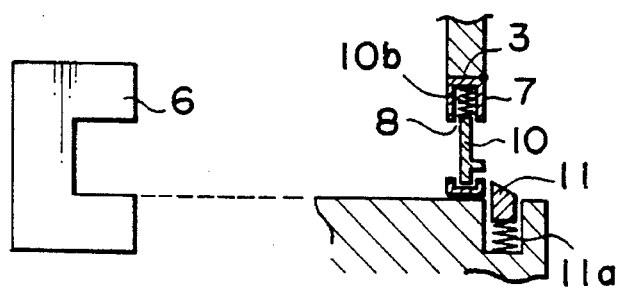
FIGS. 8A and 8B are, respectively, a schematic sectional side view and a front view of a portion of a semiconductor device card system in accordance with a seventh embodiment of the present invention.
Figure 8B:
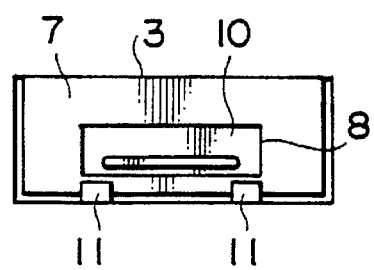

FIGS. 8A and 8B are, respectively, a schematic sectional side view and a front view of a portion of a semiconductor device card system in accordance with a seventh embodiment of the present invention. In FIGS. 8A and 8B, the engagement claw 11 for preventing the door 7 of the mounting section from opening is disposed in the lower portion of the mounting section 3. This engagement claw 11 prevents the semiconductor device card 2 from being removed from the connector 6 on the system unit side even if the back-end connector 5 is removed by mistake while the semiconductor device card system (not shown) is operating. The shutter-shaped door 10, which is closed automatically, is disposed in the door 7 of the mounting section of the semiconductor device card 2. The shutter-shaped door 10 prevents foreign matter from entering from outside even if the semiconductor device card system unit 1 is not operating.

Eighth Embodiment

Figure 9:
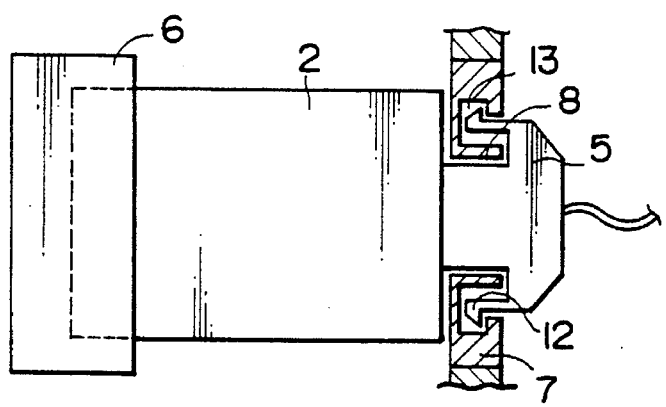
FIG. 9 is a schematic plan view illustrating a portion of a semiconductor device card system in accordance with an eighth embodiment of the present invention.
Figure 10:
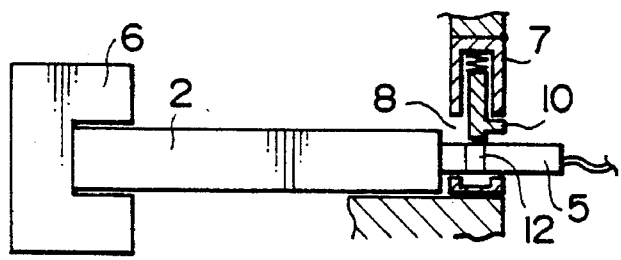
FIG. 10 is a schematic sectional side view illustrating a portion of a semiconductor device card system in accordance with the eighth embodiment of the present invention.

FIGS. 9 and FIG. 10 are, respectively, a schematic sectional plan view and a schematic sectional side view illustrating a portion of a semiconductor device card system in accordance with an eighth embodiment of the present invention. In FIGS. 9 and 10, the engagement claw 12 is disposed in the back-end connector 5 of the semiconductor device card 2 along the width of the semiconductor device card 2, and the engagement portion 13 which engages the engagement claw 12 is disposed in the door 7 of the mounting section. Further, the shutter-shaped door 10, which is closed automatically, is disposed in the door 7 of the mounting section. Therefore, when the semiconductor device card 2 is not mounted, it is possible to prevent foreign matter from entering from outside by closing the shutter-shaped door 10 disposed in the window 8 for a connector. When the semiconductor device card 2 is mounted, it is possible to prevent the semiconductor device card 2 from being removed inadvertently since the engagement claw 12 of the back-end connector 5 is engaged with the engagement portion 13 disposed in the door 7 of the mounting section.

Ninth Embodiment

Figure 11:
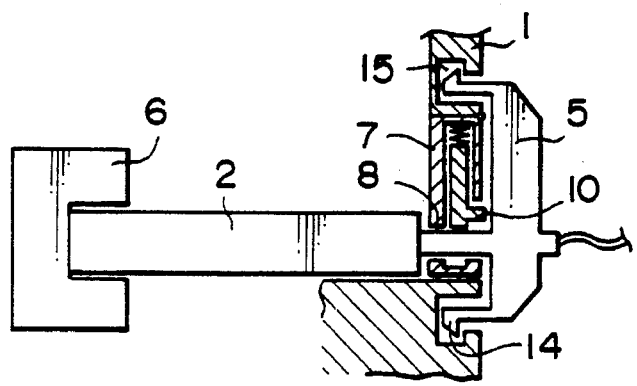
FIG. 11 is a schematic sectional side view illustrating a portion of a semiconductor device card system in accordance with a ninth embodiment of the present invention.
Figure 13:
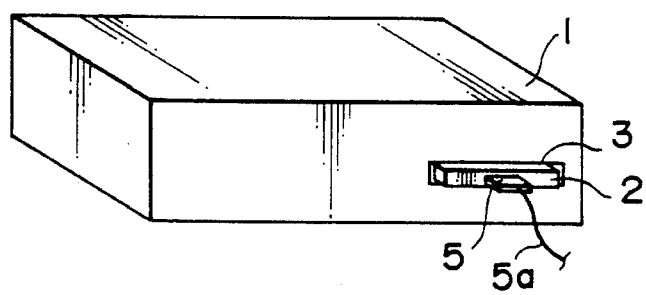
FIG. 13 is a perspective view illustrating a conventional semiconductor device card system.
Figure 14:
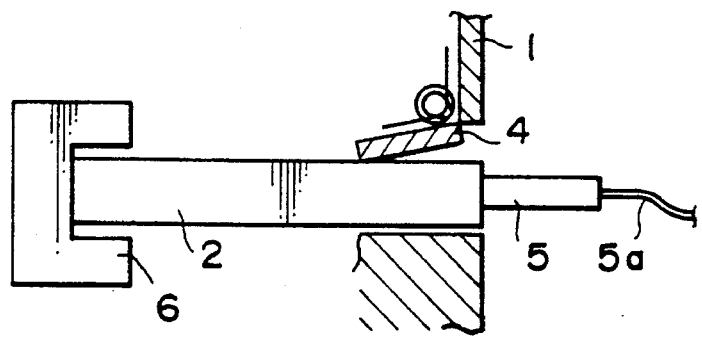
FIG. 14 is a schematic side view illustrating a portion of the conventional semiconductor device card system.

FIG. 11 is a schematic sectional side view illustrating a portion of a semiconductor device card system in accordance with a ninth embodiment of the present invention. In FIG. 11, the engagement claw 14 is disposed in the back-end connector 5 of the semiconductor device card 2 along the length of the semiconductor device card 2, and the engagement claw 15 which engages the engagement claw 14 is disposed in the door 7 of the mounting section. Further, the shutter-shaped door 10 which is closed automatically is disposed in the door 7 of the mounting section. Therefore, when the semiconductor device card 2 is not mounted, by closing the shutter-shaped door 10 disposed in the window 8 for a connector, it is possible to prevent foreign matter from entering from outside. When the semiconductor device card 2 is mounted, it is possible to prevent the semiconductor device card 2 from being removed inadvertently since the engagement claw 14 of the back-end connector 5 is engaged with the engagement portion 15 disposed in the door 7 of the mounting section.

Tenth Embodiment

Figure 12:
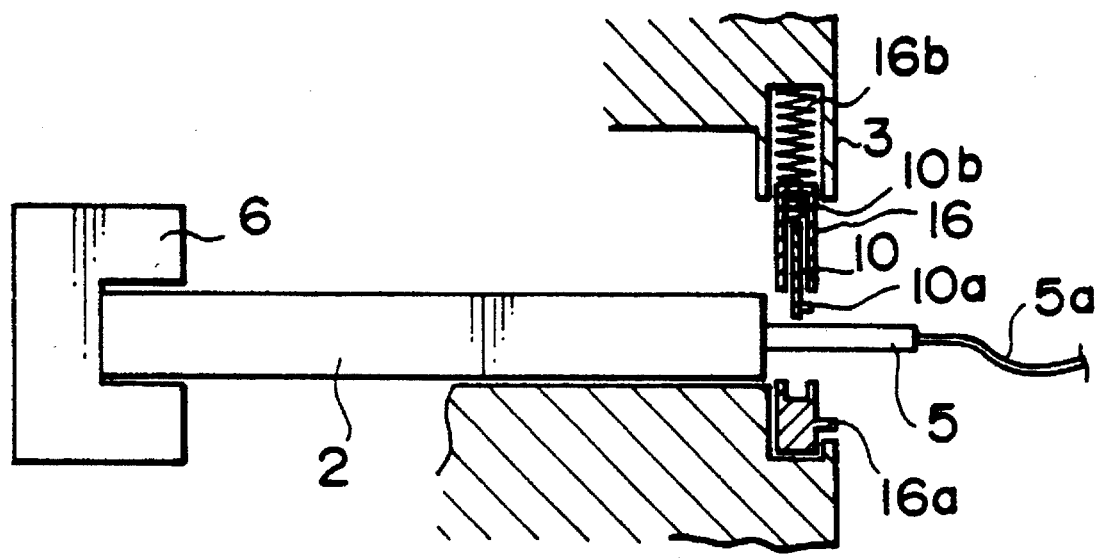
FIG. 12 is a schematic sectional side view illustrating a portion of a semiconductor device card system in accordance with a tenth embodiment of the present invention.

FIG. 12 is a schematic sectional side view illustrating a portion of a semiconductor device card system in accordance with a tenth embodiment of the present invention. In FIG. 12, reference numeral 16 denotes a shutter-shaped mounting section door mounted in the mounting section 3 of the semiconductor device card system unit 1, which door is mounted in such a manner as to be always urged in the closed direction by a spring 16b; reference numeral 16a denotes a knob for opening the shutter-shaped mounting section door 16. The shutter-shaped mounting section door 16 makes it possible to prevent foreign matter from entering from outside since the shutter-shaped mounting section door 16 is automatically closed even when the back-end connector 5 is not used.

What is claimed is:

1. A semiconductor device card system including a mounting section for receiving a semiconductor device card, the semiconductor device card having a first connector at a front end and a second connector at a back end, wherein the mounting section includes a first door openable to receive the semiconductor device card, the first door includes an opening for receiving an external connector connected to the second connector of the semiconductor device card whereby the external connector may be connected to the second connector while the first door is in a closed position.

2. The semiconductor device card system according to claim 1 including a second door at the opening openable for receiving the external connector.

3. The semiconductor device card system according to claim 2 including a biasing member for urging the second door towards a closed position.

4. The semiconductor device card system according to claim 1 wherein the mounting section includes a retractable engagement mechanism for engaging the first door.

5. The semiconductor device card system according to claim 1 wherein the mounting section includes a releasable engagement means for releasably engaging the external connector.

6. The semiconductor device card system according to claim 2 including a first knob attached to the first door and a second knob attached to the second door.

7. The semiconductor device card system according to claim 2 wherein the second door includes a retractable shutter.

8. The semiconductor device card system according to claim 2 wherein the second door includes a releasable engagement means for releasably engaging the external connector.

* * * * *